United States Patent [19]
Ozenbaugh, II

[11] Patent Number: 5,367,557
[45] Date of Patent: Nov. 22, 1994

[54] MOBILE RADIO DATA ANALYSIS SYSTEM

[75] Inventor: Richard L. Ozenbaugh, II, Glendale, Ariz.

[73] Assignee: Private Line Communications, Glendale, Ariz.

[21] Appl. No.: 36,195

[22] Filed: Mar. 23, 1993

[51] Int. Cl.$^5$ .............. H04M 11/00; H04J 3/24; H04J 3/12; H04B 15/00
[52] U.S. Cl. .................. 379/58; 370/94.1; 370/100.1; 375/1; 379/60; 380/48
[58] Field of Search ............. 342/352; 370/60, 85.2, 370/94.1, 100.1; 375/1; 379/56, 58, 60; 455/33.1, 51.1, 51.2

[56] References Cited

U.S. PATENT DOCUMENTS

| | | | |
|---|---|---|---|
| 4,696,027 | 9/1987 | Bonta | 379/60 |
| 5,081,679 | 1/1992 | Dent | 380/48 |
| 5,208,812 | 5/1993 | Dudek et al. | 370/100.1 |
| 5,216,427 | 6/1993 | Yan et al. | 370/94.1 |
| 5,224,120 | 6/1993 | Schilling | 375/1 |

Primary Examiner—Curtis Kuntz
Assistant Examiner—William Cumming
Attorney, Agent, or Firm—Tod R. Nissle

[57] ABSTRACT

A mobile radio system is provided which can transmit and receive telephone calls and which can accurately determine the date of, the length of, and the DTMF numbers dialed during a telephone call utilizing the mobile radio system.

1 Claim, 3 Drawing Sheets

MOBILE RADIO DATA ANALYSIS SYSTEM

This invention relates to mobile radio systems.

More particularly, the invention relates to a mobile radio system which can accurately determine the date of the length of and the DTMF numbers dialed during a telephone call utilizing the mobile radio system.

Mobile radio systems such as the Motorola PRIVACY PLUS SMR (Specialized Mobile Radio) system are well known in the art. Such systems typically utilize a mountain top transmitter to receive and transmit calls between a pair of dispatch units. The dispatch units are typically carried in trucks or other vehicles in the field. In operation of the dispatch units, a driver presses a button on the handset or microphone of the unit while he speaks into the handset. The dispatch units transmits the driver's voice to the mountain top transmitter, and the transmitter then selects an available frequency channel and retransmits the message. The retransmitted message is heard and received by all other dispatch units which utilize the SMR systems and which do not have the button on the handset of the receiving dispatch unit depressed. Each dispatch unit can receive only when the button on the handset is not depressed and is in the "up" position. While a conversation is being carried out between the drivers of a pair of dispatch units, the transmitter "frequency hops" and utilizes any available one of a selected number of about 768 available frequency channels found in the range of 850 MHz to 865 MHz. The Federal Communications Commission typically assigns about four to twenty-four of these channels to each user. A small number of these available frequency channels are presently utilized as control channels for carrying control data for all dispatch units. During the frequency hopping which occurs during dispatch calls, an incoming message may be on a frequency of, for example, 865,150 MHz and the message as rebroadcast by the transmitter may be on a frequency of 868.200 MHz.

The mobile radio system is also, to a lesser extent, used to conduct telephone calls. A limited number of frequency channels are assigned to receive incoming telephone calls and to make outgoing telephone calls. In contrast to the frequency hopping which occurs during a dispatch call, a telephone call is conducted over frequencies which do not vary while the call is being conducted. Consequently, an incoming telephone call is typically assigned to a single frequency channel, for example, 850,150 MHz, during the entire call. While a frequency channel is being utilized for a telephone call, the channel can not be utilized for a dispatch call or another telephone call.

A particular problem associated with conventional SMR systems is maintaining a record of when a telephone call occurred, of who received or initiated the call, and of the length of the call. Prior art systems often provide a cumulative total of the time a customer has utilized the system during a week, month, or other billing period without indicating the day a call was made, to whom the call was made, etc. This prior art system makes it difficult, if not impossible, to determine whether or not a customer has been properly billed. A customer can claim he never made a call and the company owning the SMR system does not have records with which such a claim can be readily disproved. Further, since an SMR system is primarily concerned with dispatch calls, and not telephone calls, the data streams produced by the SMR system are primarily generated to facilitate the monitoring and completion of dispatch calls and do not facilitate the use of the systems to carry out and monitor telephone calls.

Accordingly, it would be highly desirable to provide an improved SM system which would enable the date and time of telephone calls to be readily determined, along with numbers dialed during the telephone calls.

It would also be highly desirable to provide an apparatus and method for retrofitting existing SMR systems to produce a data strewwhich can be analyzed to produce an accurate record of telephone calls made by subscribers to the SMR system.

These and other, further and more specific objects and advantages of the invention will be apparent to those skilled in the art from the following detailed description thereof, taken in conjunction with the drawings, in which.

Briefly, in accordance with my invention, I provide an improved mobile radio system. The mobile radio system includes an antenna for receiving and transmitting dispatch calls between radio dispatch units, the radio dispatch units comprising half duplex units which can only transmit when not receiving and vice versa, and for receiving and transmitting a telephone call between a telephone of a customer of the mobile radio system and a telephone line. A controller is operatively associated with the antenna for directing the antenna to receive and transmit each of the dispatch calls between the dispatch units by frequency hopping over a limited number of selected airborne transmission channels. The controller also directs the antenna to receive and transmit the telephone call over one of a selected group of airborne transmission channels between the transmitter and the telephone. The one of the selected group of airborne channels used for the telephone call is fixed during the duration of the telephone call. A system operatively associated with the controller generates a real time continuous synchronous data stream indicating when one of the selected group of airborne transmission channels is being used for the telephone call, and indicating the identity of the customer telephone receiving the telephone call. Improvements are incorporated in the mobile radio system for monitoring the length of time a customer utilizes the system during the telephone call. The improvements include means for receiving the synchronous data stream and producing a real time asynchronous data stream containing primary information packets of information replicating the data in said synchronous data stream means for producing a supplemented asynchronous data stream by integrating in the asynchronous data stream in real time secondary information packets identifying digits dialed during the telephone call; a computer for receiving the supplemented asynchronous data stream and comparing the primary information packets and secondary information packets to generate a record of the telephone use information indicating the total time required to complete the telephone call and the telephone number dialed during the call; means for storing the telephone use information; and, means for recalling and displaying the telephone use information.

Figure 1:
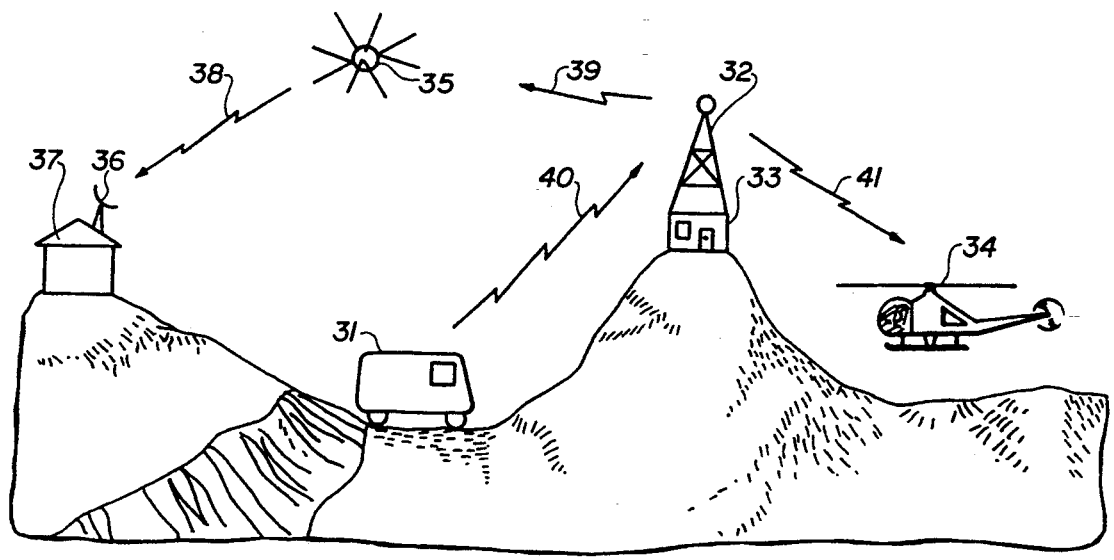
FIG. 1 illustrates presently preferred embodiments of the invention in which telephone communications are carried out between a telephone line and a telephone in a truck, helicopter, or other vehicle in the field or between a telephone line and a telephone in a fixed building structure.
Figure 4:
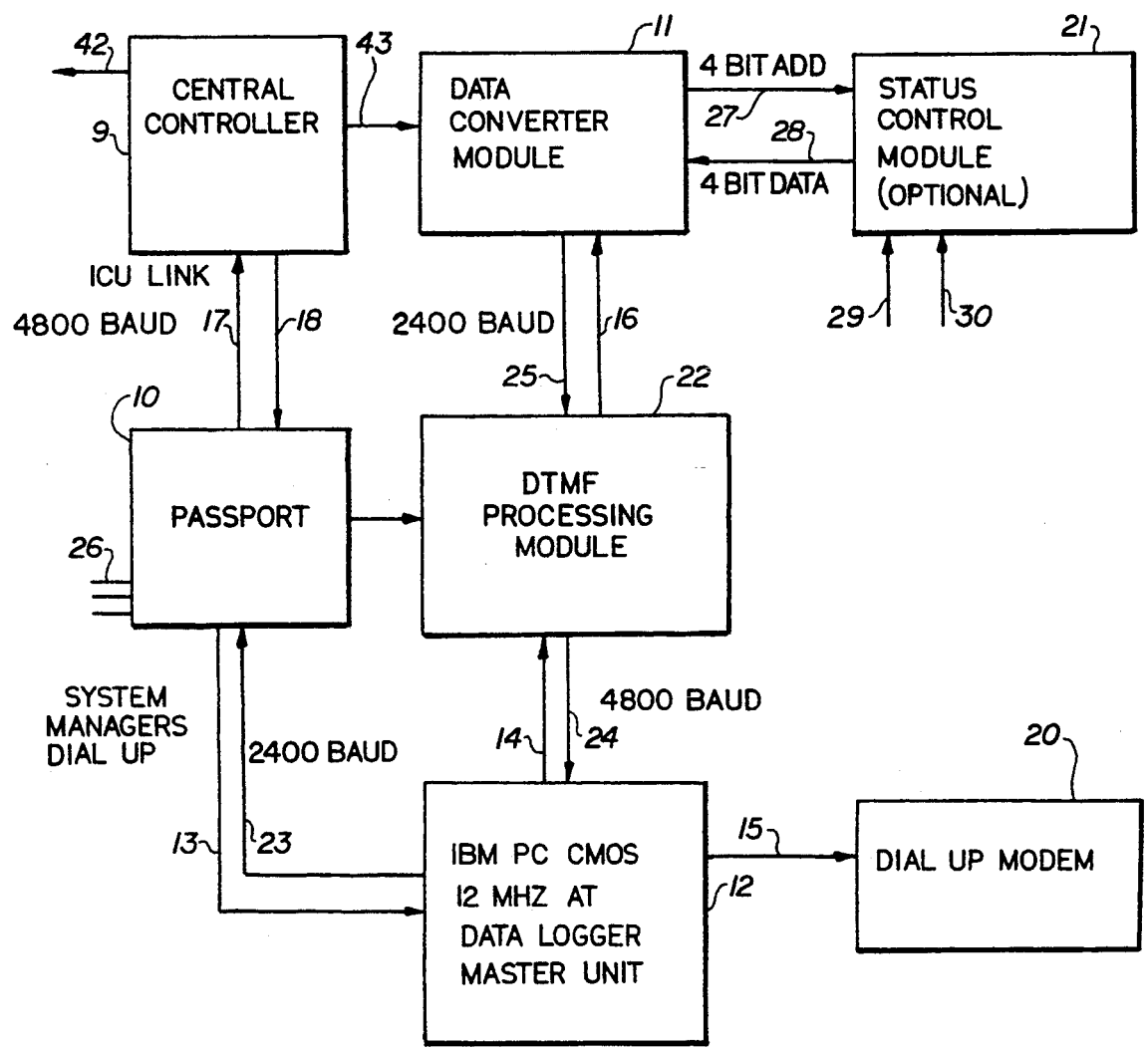

Turning now to the drawings, which depict the presently preferred embodiments of the invention for the purpose of illustrating the practice thereof and not by way of limitation of the scope of the invention, FIG. 1 illustrates an SMR system in which dispatch calls between a truck 31 and helicopter 34 are routed in conventional fashion through a transmitter 32 between the truck 31 and helicopter 34. In FIG. 4, such dispatch calls are handled by the central controller 9. Controller 9 directs the transmitter 32 to receive and transmit dispatch call communications by frequency hopping between available free frequency channels. Dispatch units can be located in a truck 31, helicopter 34, or other vehicle or can be located in a fixed building 37 or 33.

In the event vehicle 31 has a cellular-like telephone and dials an outgoing telephone number, the number is transmitted 40 over one of the available airborne frequencies in the SMR to antenna 32. While the number is being dialed, passport 10 (FIG. 4) determines that one of the dedicated airborne frequency channels in the SMR system is available for transmitting signals between vehicle 31 and transmitter 32, determines that an outgoing telephone line 26 is available, obtains a dial tone on the outgoing line 26, and directs the DTMF necessary to dial the number over the outgoing line or port 26. The telephone line can be a fiber optic transmission line, a wire transmission line, or any other conventional telephone line.

For an incoming call over a telephone line 26 or port into passport 10, passport 10 determines that one of the dedicated airborne frequency channels in the SMR system is available for transmitting airborne signals to a telephone in a vehicle 31 or 34 or in a fixed structure 37, obtains a dial tone if one of the dedicated airborne frequency channels is available, and dials the number. The central controller 9 then transmits the DTMF signals via transmitter 32 to the telephone in the vehicle 31 or 34. In the presently preferred embodiment of the system, the telephone in vehicle 31 or 34 has a six digit telephone number.

The various operational components of FIG. 4 can be housed in building structure 33 adjacent antenna 32 or can, as would be appreciated by those of skill in the art, be housed at any other desired location. The operational components of FIG. 4 can each be stored at a different location and interconnected by hard wiring, microwave, satellite 35, or other appropriate communication means which permits the components to communicate in the manner described herein.

The central controller 9 in FIG. 4 continuously produces a real time synchronous data stream comprised of packets of information each containing eighty-four bits. Each bit is a zero or a one. The eighty-four bits includes sixteen address bits, a call type bit, and ten channel or status bits. The sixteen address bits include a prefix bit, fleet identification bits, subfleet identification bits, and individual customer ID bits. The call type bit indicates whether a call is an interconnect (telephone) call or a non-interconnect (dispatch) call. The ten channel or status bits can indicate the frequency of the channel being used or can provide a variety of other information. For example, if the ten channel bits define a number in the range of zero to 768, this number defines the channel being used. If the ten channel bits define a number which is greater than 768 and less than 1023, this number provides other information. For example, the number 820 can indicate that there is an incoming call on the channel, the number 930 can indicate an outgoing call is being dialed on the channel, the number 931 can indicate there is an ongoing telephone conversation, etc. In addition to the sixteen address bits, the call type bit, and the ten channel bits noted, an additional ten error detection bits and an interleaved auto sync bit are included for a total of thirty-eight bits. Further error correction bits doubles the number of bits to seventy-six. Eight additional bits are added to provide information and even and odd parity bits for burst mode protection and to provide a sync or header bit. This makes a grand total of eighty-four pits included in each packet of information produced by the central controller 9. The central controller produces about forty-two of these information packets per second.

The data conversion module 11 receives 43 the synchronous data stream produced by central controller 9 and produces an asynchronous stream of primary bytes of data in the form of a RS232 signal receivable by conventional personal computers, modems, etc. The RS232 signal functions to break the 84 bit packets produced by controller 9 into eight bit chunks comprising a standard interface signal which is readily transmitted between computers and modems. The module 11 deletes error correction, error detection, error bits, and sync bits from each of the 84 bits packets received from controller 9 to arrive at the twenty seven bits comprising the sixteen address bits, call type bit, and ten channel or status bits earlier discussed. Since each primary byte or packet transmitted 25 by module 11 to DTMF processing module 22 can contain up to eight of the twenty seven bits, module 11 transmits four primary bytes for each 84 bit packet received from controller 9.

The DTMF module 22 continuously monitors the telephone channels or ports through which telephone calls can be made. Module 22 can include means for monitoring airborne voice transmissions or other selected portions of the telephone line or communications lines or links to detect voice transmissions or telephone numbers (DTMF tones) dialed. When the DTMF module 22 detects a DTMF sound on one of the telephone channels, it produces a secondary supplemental byte of information designating the digit dialed (either a 0, 1, 2, 3, 4, 5, 6, 7, 8, or 9) and the channel or port on which it was dialed. This supplemental byte or packet of information is interleaved or integrated into the data stream of primary bytes which module 22 is continuously receiving from module 11. The stream of primary and bytes from module 22 is transmitted 24 to the personal computer 12. The control 51 of computer 12 compares information from the primary and secondary bytes to link a dialed telephone number with the name of the customer making the call and with length of the telephone call. The personal computer 12 is able to readily make these determinations because the primary and secondary bytes are real time bytes; because the computer receives the primary and secondary bytes almost simultaneously; because at any given time the computer knows from the primary bytes the channel on which a call is taking place, knows how long the call continued before it was terminated, and knows the name of the customer making the call. The sixteen address bit or the ten channel or status bits discussed above provide this information. At the same time, each supplemental or secondary byte produced by module 22 indicates a digit of a telephone number dialed on the channel on which a call is taking place. Consequently, the control 51 of computer 12 readily links the digits of the dialed telephone number with the channel on which the call is taking place and therefore readily links the dialed telephone number with the customer who made the call. After the control 51 carries out the telephone line use determination 56 to determine the number dialed by a customer, the name of the customer, and the length of the telephone call (along with any other desired information which can be deduced from the primary and secondary bytes of information), control 51 stores the telephone line use determination information in memory 58. Control 51 can then, during later operations, direct 59 printer 50, a CRT, or other display means to reproduce the telephone line use determination information 58 stored in memory 52.

The status control module 21 can receives signals 30 from optical sensors, signals 29 from relays, or signals from other sensors. Such sensors can indicate whether the hardware components illustrating in FIGS. 1 and 4 are functioning properly. For example, a signal 29 can indicate that a relay has closed because of an electrical overload. If module 21 senses a malfunctions, it transmits a four bit alarm byte which is interleaved with the asynchronous data stream produced by module 11. The alarm byte is received by computer 12 which activates an alarm.

Computer 12 can transmit 15 telephone line use determination information, alarm information, or other information to another computer utilizing modem 20. Passport 10 can directly transmit signals 13 to computer 12 or can be interrogated 23 by computer 12 to provide 13 information. Computer 12 can transmit signals 23 to passport 10 to add or delete customer's names, the assigned frequencies for telephone calls, etc.

Figure 2:
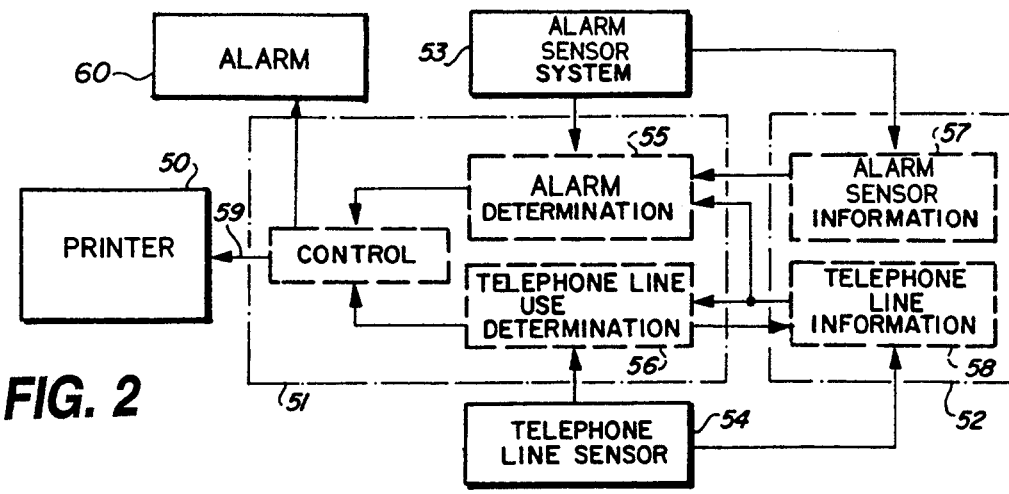
FIG. 2 is a block diagram illustrating an improved mobile radio data analysis system embodying the present invention.

FIG. 2 is a block diagram which illustrates a preferred embodiment of the improved mobile radio system of the present invention, the main components of which are a printer 50, a control 51 and a memory 52. An alarm 60, alarm sensor system 53, and telephone line sensor 54 are provided.

As indicated by the dashed lines, the control 51 performs the dual function of alarm determination 55 and telephone line use determination 56. The memory contains both alarm sensor information 57 and telephone line information 58 which is initially furnished by alarm sensor system 53 and telephone line sensor 54, respectively. After the telephone line use determination 56 information and the alarm determination 55 information are stored in memory 52, during subsequent operational cycles this information can be recalled from the memory 52 and the recalled information is directed by control 51 to printer 50 or other display means. Also, when the alarm determination 55 information indicates an abnormal condition, control 51 can activate alarm 60.

The memory 12 can be any suitable prior art memory unit such as are commonly used in numerical control, numerical calculation, communication machines, etc. For example, electromagnetic memories such as magnetic, optical, solid state, etc. or mechanical memories such as paper tape. The telephone line sensor presently consists of data converter module 11 and DTMF processing module 22 in combination with the pre-existing central controller 9 and passport 10. The alarm sensor system presently consists of status control module 21 in combination with the modules 11 and 22 which transmit the alarm sensor information to control 51 of computer 12.

Figure 3:
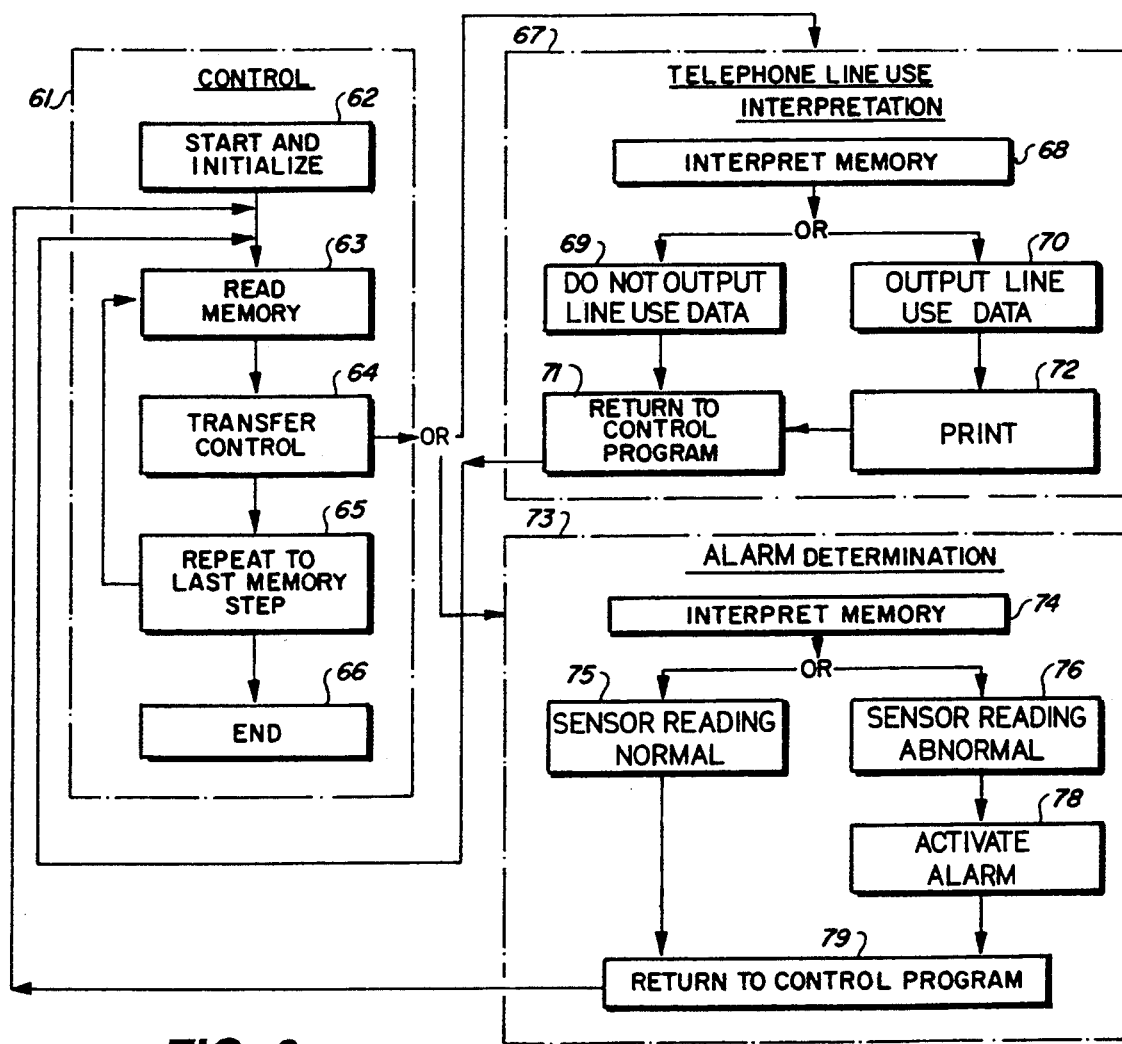
FIG. 3 is a block diagram which illustrates a typical program or logic function utilized in accordance with the presently preferred embodiment of the invention; and, FIG. 4 is a block diagram illustrating hardware components utilized in the practice of the invention.

FIG. 3 is a block flow diagram which illustrates a typical program or logic function which is executed by the control 51 in connection with its alarm determination and telephone line use determination functions. The basic control program 61 consist of commands to "start and initialize" 62, "read memory" 63 and "transfer control" 64 to either the telephone line use interpretation sub-routine 67 or the alarm determination sub-routine 73.

The telephone line use interpretation sub-routine 67 consists of commands to "interpret memory" 68 (i.e., determine if the telephone line use determination information should be output on printer 50, which is usually done at the end of each day), followed by "do not output line use data" 69 and "output line use data" 70. In the event the output of telephone line use data is dictated, the "print" 72 step is carrier out, followed by "return to control program" 71. If, instead, the output of telephone line use data to printer 50 is not called for, step 69 is followed by "return to control program" 71.

The alarm determination sub-routine 73 includes an "interpret memory" 74 step (i.e., are sensor reading normal), followed by "sensor reading normal" 75 or "sensor reading abnormal" 76 steps. In the event the sensor reading is abnormal, the "activate alarm" 78 step is carried out, followed by "return to control program" 79. When sensor reading are normal, the "return to control program" 79 step is executed. The telephone line use interpretation subroutine 67 and the alarm determination sub-routine are repeated as indicated by the "repeat to last memory step" 65 of the control program 41 followed by an "end" program step 66 which completes the execution of the program.

Having described the presently preferred embodiments of my invention in such terms as to enable those skilled in the art to understand and practice it, I Claim:

1. In combination with a mobile radio system including
   an antenna for receiving and transmitting
      dispatch calls between radio dispatch units, the radio dispatch units comprising half duplex units which can only transmit when not receiving and vice versa, and
      a telephone call between a telephone of a customer of the mobile radio system and a telephone line,
   a controller operatively associated with said antenna for
      directing said antenna to receive and transmit each of the dispatch calls between the dispatch units by frequency hopping over a limited number of selected airborne transmission channels,
      directing said antenna to receive and transmit the telephone call over one of a selected group of airborne transmission channels between the transmitter and the telephone, the one of the selected group of airborne channels used for the telephone call being fixed during the duration of the call,
   means operatively associated with the controller for generating a real time continuous synchronous data stream indicating when one of the selected group of airborne transmission channels is being used for the telephone wall, and the identity of the customer telephone receiving the telephone call, the improvements for monitoring the length of time a customer utilizes the system during the telephone call, said improvements including (a) means for receiving said synchronous data stream and producing a real time asynchronous data stream containing primary information packets of information replicating the data in said synchronous data stream;

(b) means for producing a supplemented asynchronous data stream by integrating in said asynchronous data stream in real time information secondary information packets identifying digits dialed during the telephone call;

(c) a computer for receiving said supplemented asynchronous data stream and comparing the primary information packets and secondary information packets to generate a record of the telephone use information indicating the total time required to complete the telephone call and the telephone number dialed during the call;

(d) means for storing said telephone use information; and, (e) means for recalling and displaying said telephone use information.

* * * * *